United States Patent [19]
Kunze et al.

[11] 4,216,499
[45] Aug. 5, 1980

[54] INSPECTION SYSTEM FOR BAGGAGE

[75] Inventors: Claus Kunze, Taunusstein; Manfred Dennhoven, Wiesbaden, both of Fed. Rep. of Germany

[73] Assignee: Heimann GmbH, Fed. Rep. of Germany

[21] Appl. No.: 928,822

[22] Filed: Jul. 28, 1978

[30] Foreign Application Priority Data

Aug. 5, 1977 [DE] Fed. Rep. of Germany ....... 2735400

[51] Int. Cl.² .............................................. H04N 7/18
[52] U.S. Cl. .................... 358/111; 358/127; 358/140
[58] Field of Search .................... 358/111, 140, 127

[56] References Cited

U.S. PATENT DOCUMENTS

| | | | |
|---|---|---|---|
| 3,919,467 | 11/1975 | Peugeot | 358/111 |
| 4,031,545 | 6/1977 | Stein | 358/111 |
| 4,057,836 | 11/1977 | Munsey | 358/140 |

Primary Examiner—Howard W. Britton
Attorney, Agent, or Firm—Hill, Van Santen, Steadman, Chiara & Simpson

[57] ABSTRACT

A baggage inspection system utilizing fluoroscopy of baggage pieces and the like, employing an X-Ray flash unit, a television pick-up unit for scanning the X-Ray image, storage of the television image and subsequent image reproduction by a television monitor, in which, in accordance with the invention, the memory is a digital solid state memory for the digital storage of a half frame, of an interlaced video frame of the television pick-up unit, with a capacity of 6 to 8 bits per imagepoint of the image signal to be stored.

3 Claims, 2 Drawing Figures

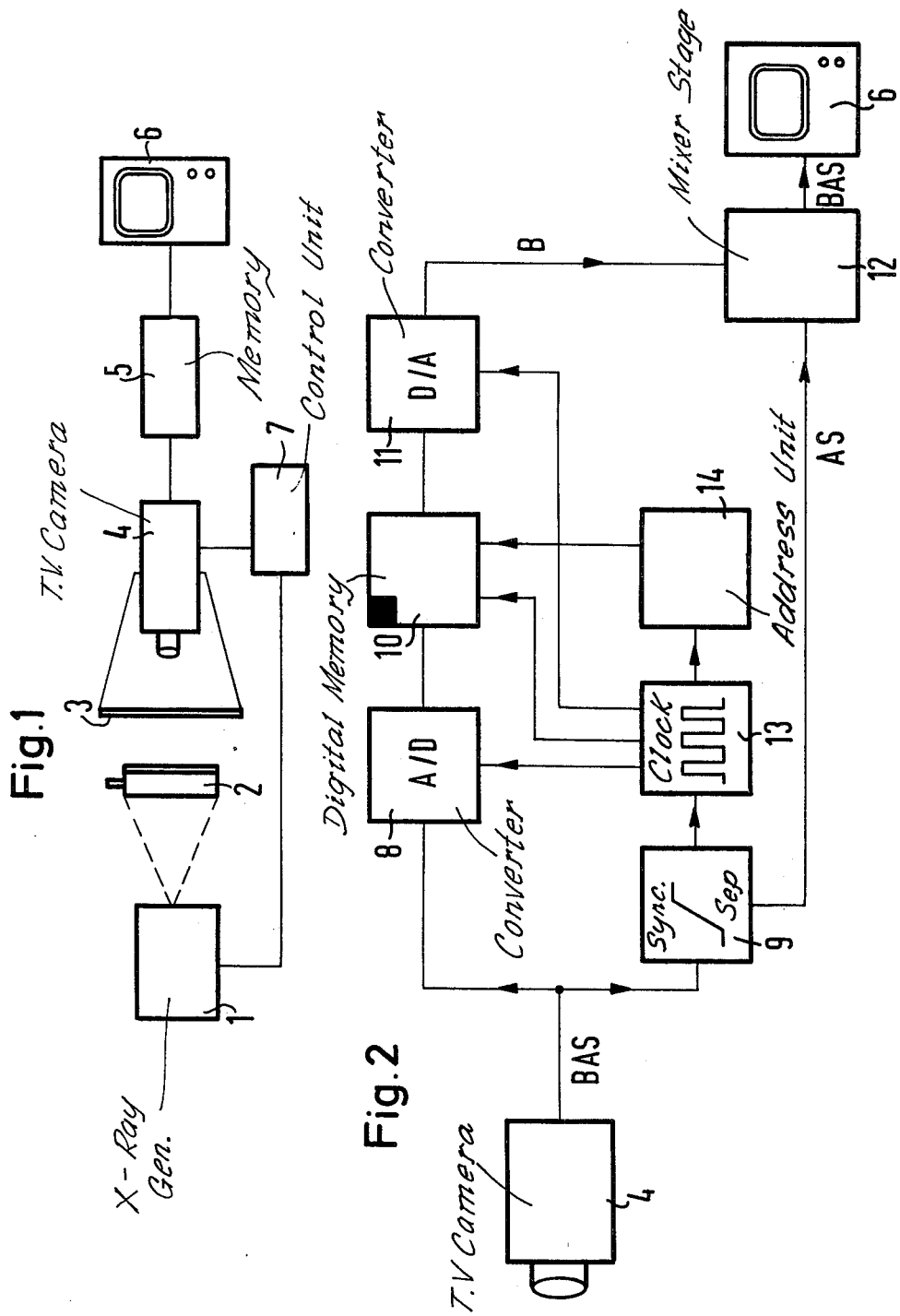

INSPECTION SYSTEM FOR BAGGAGE

BACKGROUND OF THE INVENTION

The invention relates to an apparatus for the inspection of baggage and similar articles, in which the radiation of an X-Ray flash generator penetrates the object to be inspected, and produces therefrom a shadow image on a fluorescent screen, which is scanned by a television camera, with the image signals produced thereby being stored in a suitable memory, from which the image signals are supplied to a television monitor which is operative to reproduce the stored image.

An apparatus of this general type is known, for example, such as described in U.S. Pat. No. 4,047,035. Baggage inspection systems of generally corresponding design have already proven very successful at many airports. The principle of short-duration fluoroscopy and production of a shadow image, utilizing an X-ray flash, and the principle of the temporarily unrestricted observation possibilities of the stored image, permits a reasonably reliable inspection, and at the same time assures that the inspection will be harmless to the objects being inspected, particularly where film materials and the like, contained in the inspected objects, are involved.

The present terrorist situation and the hectic nature of peak operation periods during clearance of passengers and inspection of their hand baggage, which can be expected to continually increase, results in constant endeavors to develop improvements in existing inspection systems. Not only is the reliability of the system a major problem, but also the desirability, if not necessity, to achieve the greatest possible passenger traffic flow. At the same time the quality of the inspection cannot be adversely affected if the desired objectives are to be achieved.

BRIEF SUMMARY OF THE INVENTION

The present invention thus has as its objective the improvement in baggage inspection systems of this type. It is therefore proposed in accordance with the invention, in a baggage inspection system of the type referred to, that the memory in which the image is stored be a solid state digital memory, for example, an MOS memory having a capacity of 6 to 8 bits per image point of the image to be stored and reproduced, and that the image so stored is in the form of a half frame of the usual interlaced video frame normally produced by a television camera. The digital memory is therefore operatively connected to the camera by an analog/digital-converter with a digital-analog-converter connecting such digital memory to the television monitor for reproduction of the image.

Prior baggage inspection systems of the general type involved have utilized a signal storage tube as the image storing memory, for example such as described in the publication "Funkschau", 1974, vol. 22, pages 2583–2590. With such a tube, an image signal corresponding to the image to be stored, supplied by the television camera, is written in or entered by means of an electron deflection beam on a target plate, and is there stored in an analog manner at respective individual image points. The readout operation is again achieved by means of a deflected electron beam which scans the stored image, resulting in conversion into a signal sequence.

U.S. Pat. No. 3,884,816 also shows a system for the inspection of baggage pieces, also utilizing an analog recording monitor which, as stated therein, utilizes a synchroscope having a long persistence. The image quality which can be obtained in image stores or memories, utilizing signal converter storage tubes, is greatly dependent upon the adjustment of the various operating parameters such as those pertaining to the electron beam, target voltages, focusing currents, currents through correction coils, etc. In spite of a relatively very high technical outlay, as of the present time, there has been no success in manufacturing tube memories which are temperature insensitive and stable over long periods of time. Consequently, in utilizing such a storage, some form of monitoring, and a substantially constant correction of the operating parameters is required, which of necessity must be effected by an expert. A baggage inspection system of this type accordingly requires constant maintenance by expensive service personnel.

In addition to the multiple production or read-out of an image by means of a deflected electon beam, there also exists additional distortion possibilities which in practice are evident in the image reproduction. For example, the baggage contents reproduced on the monitor is substantially more accurate at the center of the image than at the corners thereof. It is believed apparent that a reliable and rapid recognition of suspect objects detected on the television monitor can be achieved only if the corners of the image are free of distortion, without which an assurance of accuracy cannot be achieved.

Solid state memory devices for the storage of images have been known for a long time, for example, such as utilized in television studio systems. However, the enormously high price of such memories, which is on the order of magnitude of the total cost of a complete baggage inspection system, has heretofore been sufficient reason on the part of the expert for accepting the disadvantages of a tube memory.

With a baggage inspection system in accordance with the invention, such prejudice of the expert is overcome. The outlay, which is considered the decisive disadvantage in the utilization of a solid state image memory is considerably reduced by virtue of the fact that in the design of the present invention, there is a strict adherence to technically reasonable maximum requirements imposed on the entire system.

In accordance therewith, a first limitation or assumption in this respect is that a storage capacity of 6 to 8 bits per image point is adequate. A second limitation is achieved by utilizing only one of the half frames of the usual video frame, employing the so-called interlaced scanning as produced by a television camera, whereby only a half frame may be utilized and entered in the memory. Accordingly, only one image is employed as the observation image, produced at the television monitor, which image may correspond either to the odd or the even lines of the picture produced by the scanning electron beam of the television camera.

With these two limitations, a storage capacity on the order of magnitude of $10^6$ bits is adequate for the digital storage of the image produced on the fluorescent screen.

By this means an image quality is achieved which exceeds that of a baggage inspection system utilizing a tube memory, particularly with respect to a distortion-free representation of the corners of the image. The cost requirements, however, nevertheless remain on the same order of magnitude as current systems. In addition, the reliability of the system due to the freedom of maintenance of the memory is of major importance. This is particularly true in those instances in which extreme climatic conditions are involved and highly trained service personnel or the only personnel available are those with insufficient qualifications.

BRIEF DESCRIPTION OF THE DRAWINGS

In the drawings wherein like reference characters indicate like or corresponding parts:

FIG. 1 schematically illustrates the main components of a baggage inspection system; and FIG. 2 is a block circuit diagram illustrating the course of the image and control signals from the television camera to the television monitor.

DETAILED DESCRIPTION OF THE INVENTION

Referring to FIG. 1, the reference numeral 1 indicates generally an X-Ray/generator, which would normally be contained in a suitable housing having adequate shielding to protect the surroundings and personnel from stray X-radiation. The radiation penetrates an inspection object 2 and produces a shadow image on a fluorescent screen 3. At the side of the screen 3, remote from the object 2 under inspection, is a highly sensitive television camera 4 which is focused on the screen 3 and preferably is equipped with a so-called EIC (electron induced conductivity) pickup tube.

The television camera 4 scans the shadow image on the screen 3 and the television signal produced thereby is stored in a memory 5 which is a solid state digital memory. The digitally stored image can be read-out and, following corresponding electro-optical conversion, can be observed on a television monitor 6 for an arbitrary period of time. A control unit 7 guarantees that the X-ray flash generator 1 and the television camera 4 will be suitably operated in synchronism. In accordance with the invention only a half frame of the usual interlaced video frame of the television camera is utilized, i.e. only either the even or odd scanning lines of the electron beam of the television tube in the camera 4 are utilized. The solid state memory is preferably here slave-synchronized, with the timing pulses necessary for the storage operation being derived from the television signal. As illustrated in FIG. 2, which illustrates components disposed between the television camera 4 and the television monitor 6, the video signal BAS representing the output signal of the television camera 4 is supplied to an analog/digital converter (A/D-converter) 8 to a sync separator 9 which may be in the form of an amplitude filter. The digital signals produced by the converter 8 are supplied to the input of a solid state digital storage memory 10 whose output is connected to the input of a digital/analog-converter (D/A converter 11). The output of the D/A-converter 11 is supplied in the form of an analog signal B, to a mixer stage 12, which also receives an output signal AS from the sync separator 9. The combined signal BAS is then supplied from the mixer 12 to the television monitor 6.

An output of the sync separator 9 is also connected to a clock pulse unit 13 which supplies pulses to respective control inputs of the A/D converter 8, the memory 10, the D/A-converter 11 and an addressing unit 14 which is connected to one address input of the memory 10.

The sync separator 9 is adapted to separate the blanking and synchronizing signals AS from the image signal B of the video signals BAS supplied by the television camera 4. The signals AS and in turn supplied to the clock pulse unit 13, which produces therefrom the additional clock pulse signals required for the control of the converters 8, 11, addressing unit 14 and memory 10. The analog video signal supplied to the A/D converter 8 is there digitized and supplied to the memory 10, while addressing unit 14 insures the necessary address selection of the desired storage locations. Signals read out of the memory 10 are supplied to the D/A transducer 11 which converts such signals back into an analog image signal B, which is supplied to the mixer 12. The latter combines such analog image signal B with the blanking and synchronizing signals AS, delivered by the sync separator 9, into a complete video signal BAS capable of being processed by television monitor 6 and suitably displayed thereby. The stored signal in the memory 10 can be read-out or re-read and made available in the television monitor 6 as an image for observation until a new video signal is stored.

Other than the selected storage capacity limitation previously referred to, the specific construction of converters 8, 11, as well as the memory 10 and the addressing unit 14, have no specific further restrictions imposed thereon and conventional units can be employed. For example, the solid state digital memory 5 can be an MOS memory embodying a construction such as that described in the publication "Siemens Forschungs- und Entwicklungsberichte"(Research and Development Reports) April, 1975, pages 196–206. Likewise, the respective analog/digital and digital/analog converters can be of a construction similar to that described in the publication "Comsat Technical Review", vol. 2, no. 1, Spring 1972, pages 39–72.

It will be appreciated that a baggage inspection system constructed in accordance with the invention requires merely a one-time adjustment of the units utilized for the image storage, following which subsequent changes in the uniformity of the signal levels or other deteriorations will not take place in the normal operation of the system. This is a very important advantage as compared with baggage inspection systems utilizing tube storage structures, and furthermore is achieved without an appreciable increase in expense, while at the same time improving the image quality.

Having thus described our invention it will be obvious that although various minor modifications might be suggested by those versed in the art, it should be understood that we wish to embody within the scope of the patent granted hereon all such modifications as reasonably, and properly come within the scope of our contribution to the art.

We claim as our invention:

1. Apparatus for the inspection of baggage pieces and the like, comprising an X-ray flash generator whose radiation penetrates the object to be inspected, and produces therefrom a shadow image on a fluorescent screen, a television camera disposed to scan such a shadow image for forming an interlaced image frame of two so-called half image frames, an analog-digital-converter to which the output of the camera tube, in the form of a half image frame, is supplied, image storage means in the form of a solid state digital memory with a storage capacity for the image points of the lines of a half image frame with 6 to 8 bits per image point of the stored signal, for storing the digital signals of a half image frame supplied from said converter, a television monitor for reproducing the stored half image frame, and a digital/analog-converter connecting the television monitor and said digital memory for supplying the stored signals therein, in the form of analog signals, to said television monitor.

2. Apparatus according to claim 1, wherein said solid state digital memory is constructed for slave-synchronization capability, and a clock pulse supply unit, which is synchronized with the television signal, for synchronously controlling said memory and associated converters in synchronism with the television camera.

3. Apparatus according to claim 2, wherein said clock pulse supply unit is connected, by a sync-separator, to the television camera, for effecting the synchronization of such unit, a mixer unit operatively connecting said memory to the television monitor, said sync-separator being connected to said mixer unit to supply thereto necessary blanking and synchronizing signals whereby said mixer unit supplies both the latter and video signals to the television monitor.

* * * * *